United States Patent Office 3,442,895
Patented May 6, 1969

3,442,895
2-TERTIARYAMINO ALKYL-AMINO AN-THRAQUINONES, THEIR ACID ADDITION AND QUATERNARY AMMONIUM SALTS THEREOF
Andree Bugaut, Boulogne-sur-Seine, Gregoire Kalopissis, Paris, and Jacques Bertrand, Tremblay-les-Gonesses, France, assignors to Societe Anonyme dite: L'Oreal, Paris, France, a corporation of France
No Drawing. Original application May 19, 1967, Ser. No. 639,915. Divided and this application Oct. 23, 1967, Ser. No. 677,068.
Claims priority, application France, Oct. 29, 1962, 913,810; Jan. 8, 1963, 920,795; Apr. 2, 1963, 930,212; June 20, 1963, 938,822
Int. Cl. C09b *1/28, 1/16, 5/42*
U.S. Cl. 260—247.1    8 Claims

ABSTRACT OF THE DISCLOSURE

An anthraquinone dyestuff having the formula:

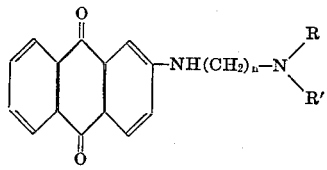

in which $n$ is an interger from 2 to 6, and

is selected from the group consisting of a lower dialkyl amine, morpholine and piperidino, and its acid addition and quaternary ammonium salts.

---

This application is a division of an application bearing the same title and filed by us on May 19, 1967, Ser. No. 639,915, which was a streamlined continuation of application Ser. No. 319,635, filed Oct. 24, 1963, now abandoned.

This invention relates to new, improved hair dye compounds that are amino derivatives of anthraquinone which are unusually sun and weather resistant to color changes.

The new dyestuff compounds of the invention have the formula:

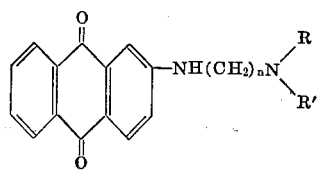

in which $n$ is from 2 to 6 and R and R' each represents a lower alkyl group, or together with the adjacent nitrogen represents a dialkyl amine, or a saturated mononuclear heterocyclic radical such as morpholino and piperidino, and their acid addition and quaternary ammonium salts. In this formula, R and R' may be identical or different, and may be, for example, methyl, ethyl or propyl groups, or R and R', together with the adjacent nitrogen, may represent morpholino or piperidino radicals. It is preferred that R and R' represent ethyl radicals or, together with the adjacent nitrogen, represent a morpholino radical, and $n$ is 2 or 3. These compounds may be used in the form of their acid addition and quaternary ammonium salts.

When the tertiary amino group in the formula is quaternized, the group attached to the anthraquinone nucleus has preferably the following formula:

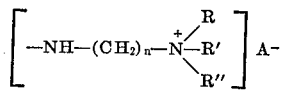

in which $n$, R and R' are as hereinbefore defined, R" represents a lower alkyl radical, especially methyl, and $A^-$ represents an anion, such as a halide or especially a methylsulphate ion.

Of the anthraquinone derivatives falling within the scope of this embodiment of the invention, there may be mentioned inter alia the following compounds: 2-($\beta$-diethylaminoethylamino)anthraquinone; 2 - ($\gamma$ - diethylaminopropylamino)anthraquinone; 2 - ($\beta$ - morpholinoethylamino)anthraquinone; and their acid addition and quaternary ammonium salts.

It have been discovered that the dyestuffs of this invention and their quaternary ammonium derivatives are very suitable as dystuffs for dyeing hair, especially at ordinary temperatures. These dyestuffs have, owing to the presence of the tertiary or quaternary amino function, high affinity for hair over a very wide pH range, e.g. of 4.5 to 9, depending upon whether the tertiary or quaternary derivatives are employed while, in addition, they possess good solubility in water.

The dyeings obtained with these dyestuffs have the additional advantage of being resistant to sunlight. Finally, the dyestuffs are fully compatible with the adjuvants generally present in dyeing soltutions.

The dyeings obtained on hair with the dyestuffs of the invention are generally yellow or golden-yellow. This is a considerable advantage because mixtures of the dyestuffs with the red to blue-green dyestuffs, can be used to obtain an interesting range of natural shades.

The compositions for dyeing hair are generally in the form of aqueous solutions of pH 4.5 to 9 which are very easily prepared by simple dissolution in water of one or more of the new dyestuffs, with or without dyestuffs. The solutions may also contain, where necessary, the adjuvants generally employed in compositions for dyeing hair, e.g. emollients, perfumes, and wetting agents. The dyestuff concentration in the dyeing solutions may vary within wide limits and the precise concentration chosen depends upon the result desired.

Hair dyeing with the new compounds is carried out in the usual manner by applying them to the hair for an appropriate time, preferably at normal temperature.

These new dyestuffs may be prepared by reacting, for example, $\beta$-chloro (or $\beta$-bromo) anthraquinone with an alkylenediamine of the formula:

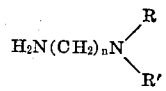

in which $n$, R and R' are as hereinbefore defined, in the presence of pyridine. The quaternization of the tertiary anthraquinone derivatives thus obtained can be very simply carried out by reacting a quaternizing agent, such as methyl sulphate or an alkyl halide, with the anthraquinone derivative containing the tertiary amino group, in the presence or absence of an appropriate solvent.

The following examples illustrate, on the one hand, the preparation of the new dyestuffs and, on the other, the use of these dyestuffs in hair dyeing.

Example 1.—Preparation of 2-($\beta$-diethylamino ethyl) aminoanthraquinone

A mixture of $\beta$-chloroanthraquinone (0.1 g. mol.) and N,N-diethylethylenediamine (0.4 g. mol.) in 50 cc. of pyridine is heated for 8 hours at 100–104° C. After cooling and evaporation of the excess pyridine, the crude product obtained is recrystallized from hexane. The desired product is thus obtained and melts at 122° C.

*Analysis.*—Calculated: C, 74.51%; H, 6.84%; N, 8.70%. Found: C, 74.5–74.33%; H, 6.61–6.72%; N, 8.68–8.74%.

Example 2.—Preparation of (2-anthraquinonylaminoethyl)diethylmethylammonium methylsulphate The tertiary amino dyestuff described in Example 1 is reacted with methyl sulphate in the presence of benzene under reflux. After cooling, the desired quaternary ammonium salt precipitates as a yellow powder. It melts with decomposition at a temperature of 194–196° C.

*Analysis.*—Calculated: N, 6.25%. Found: N, 6.10–6.10%.

Example 3.—Preparation of 2-(γ-diethylaminopropyl) aminoanthraquinone

By proceeding as in Example 1, but using γ-diethyl aminopropylamine, the desired product is obtained and when purified by chromatography through alumina in the usual way, melts at 122° C.

*Analysis.*—Calculated: C, 75.00%; H, 7.14%; N, 8.33%. Found: C, 75.05–75.29%; H, 7.37–7.06%; N, 8.70–8.39%.

Example 4.—Preparation of (2-anthraquinonylaminopropyl)-diethylmethylammonium methylsulphate Methylsulphate is reacted in the usual way in the cold with the corresponding tertiary base, described in Example 1, using benzene as solvent. The product thus obtained melts with decomposition at 128–130° C.

Example 5.—Preparation of 2-(β-morpholinoethyl) aminoanthraquinone

By proceeding as in Example 1, but using a mixture of β-chloro-anthraquinone and N-aminoethylmorpholine, there is obatined, after purification of the crude product by chromatography through alumina, the desired product, which melts at 189° C.

*Analysis.*—Calculated: C, 71.43%; H, 5.95%; N, 88.33%. Found: C, 71.39–71.30%; H, 6.11–6.04%; N, 8.22–8.02%.

Example 6.—Preparation of (2-anthraquinonylaminoethyl)methylmorpholinium methylsulphate This product is obtained from the tertiary amino dyestuff described in Example 5, dissolved in chlorobenzene, by the action of methyl sulphate at an elevated temperature. After purification by recrystallization from hexane, the desired product is obtained, M.P. 228–230° C. (dec.).

*Analysis.*—Calculated: N, 6.06%. Found: N, 5.90–5.87%.

Example 7

The following mixture is prepared:

| | G. |
|---|---|
| (2-anthraquinonylaminoethyl) - methylmorpholinium methylsulphate | 1 |
| Octylphenol condensed with 10 molecules of ethylene oxide | 0.9 |

Na₂CO₃ to pH 7.
Water to 100 cc.

This solution is applied to blond hair and left in contact therewith for 10 to 15 minutes at ambient temperature, and the hair is then abundantly rinsed with water and dried. An intense golden tint is thus obtained. This solution, when applied in the same way to white hair, colors it a light gold-blond.

Example 8

The following mixture is prepared:

(2 - anthraquinonylaminoethyl)diethylmethylammonium methylsulphate—1 g.
Na₂CO₃ to pH 7.
Water to 100 cc.

This solution, when applied to white hair, as in the preceding example, gives it a fine gold-blond color.

Example 9

The following mixture is prepared:

| | G. |
|---|---|
| (2 - anthraquinonylaminoethyl) - methylmorpholinium methylsulphate | 1 |
| (1,4 - anthraquinonylaminoethyl) - methylmorpholinium bis-methylsulphate | 0.5 |
| (1,5 - anthraquinonylaminoethyl) - methyl - morpholinium bis-methylsulphate | 0.5 |

Na₂CO₃ to pH 7.
Water to 100 cc.

By applying this solution to 100% white hair under the conditions described in Example 7, a gold-chestnut color is obtained.

What is claimed is:

1. An anthraquinone dyestuff having the formula:

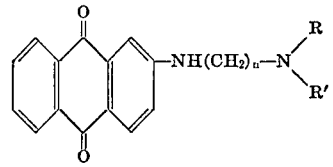

in which $n$ is an integer from 2 to 6, and

is selected from the group consisting of lower dialkyl amine, morpholine and piperidino.

2. An acid addition salt of the anthraquinone dyestuff claimed in claim 1.

3. A quaternary ammonium salt of the dystuff claimed in claim 1.

4. A compound of claim 1, in which said compound is 2-(β-diethylaminoethylamino)anthraquinone.

5. A compound of claim 1, in which said compound is 2-(γ-diethylaminopropylamino)anthraquinone.

6. A compound of claim 1, in which said compound is 2-(β-morpholinoethylamino)anthraquinone.

7. A compound of claim 3, in which said compound is (2-anthraquinonylaminoethyl) diethylmethyl ammonium methylsulphate.

8. A compound of claim 2, in which said compound is (2 - anthraquinonylaminoethyl) methylmorpholinium methylsulphate.

References Cited

UNITED STATES PATENTS 3,100,739  8/1963  Kaiser et al. _____ 167—88
3,123,605  3/1964  Turetzky et al. _____ 260—247.5

ALEX MAZEL, *Primary Examiner.*

J. TOVAR, *Assistant Examiner.*

U.S. Cl. X.R.

8—10.1; 260—247.5, 272, 378